Oct. 19, 1965　　　F. A. REUSTLE　　　3,212,792
TRACTOR-TRAILER SAFETY HITCH
Filed Oct. 30, 1963　　　　　　　　　　3 Sheets-Sheet 1
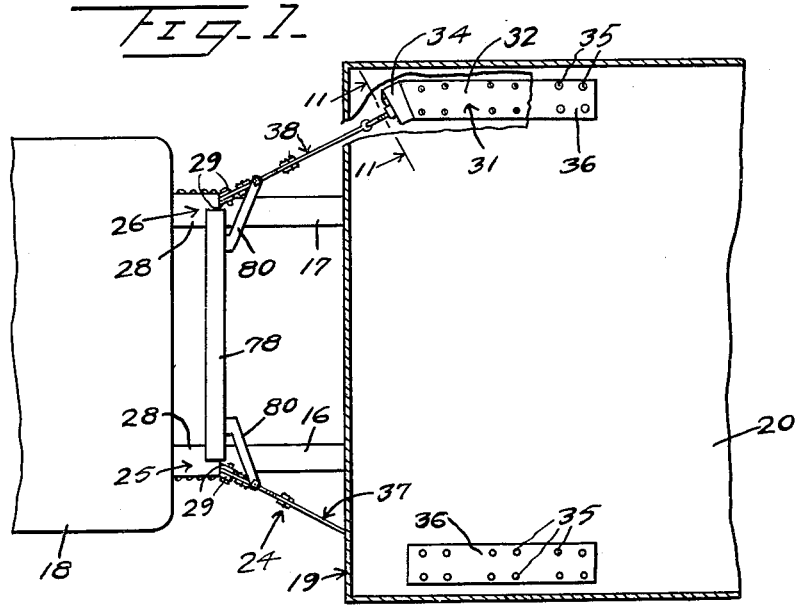
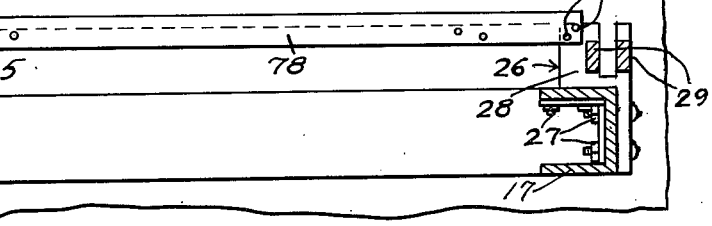
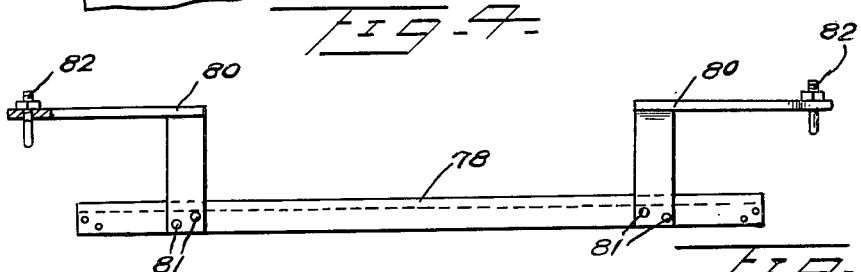
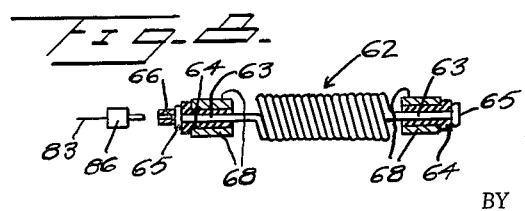
INVENTOR
FRANK A. REUSTLE
BY John N. Randolph
ATTORNEY

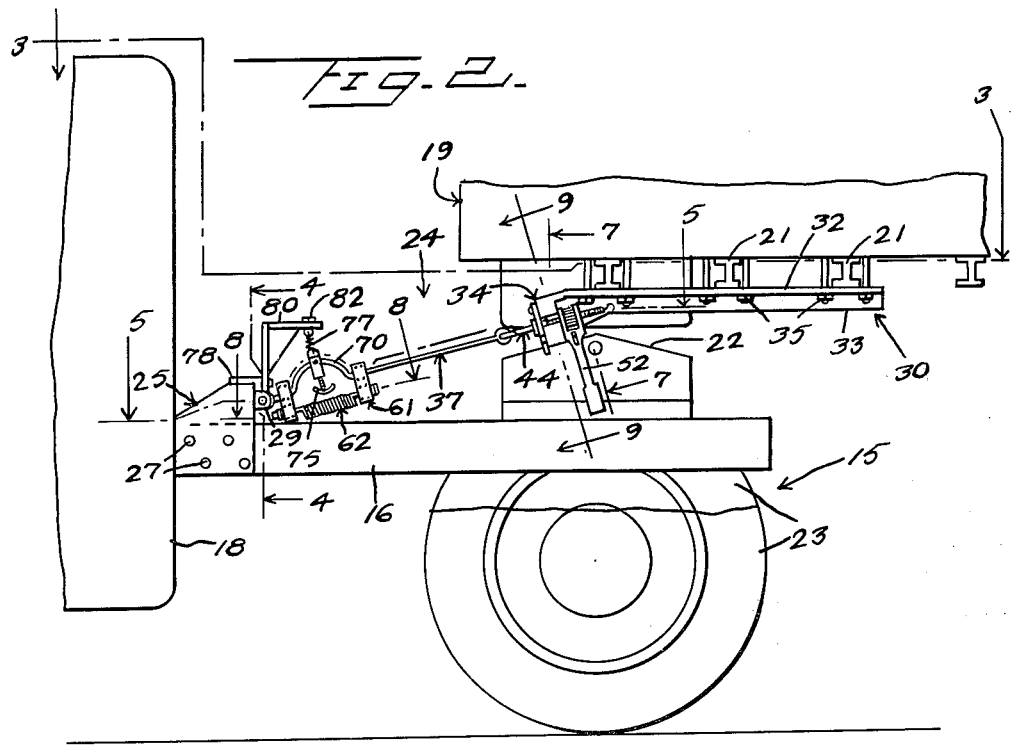

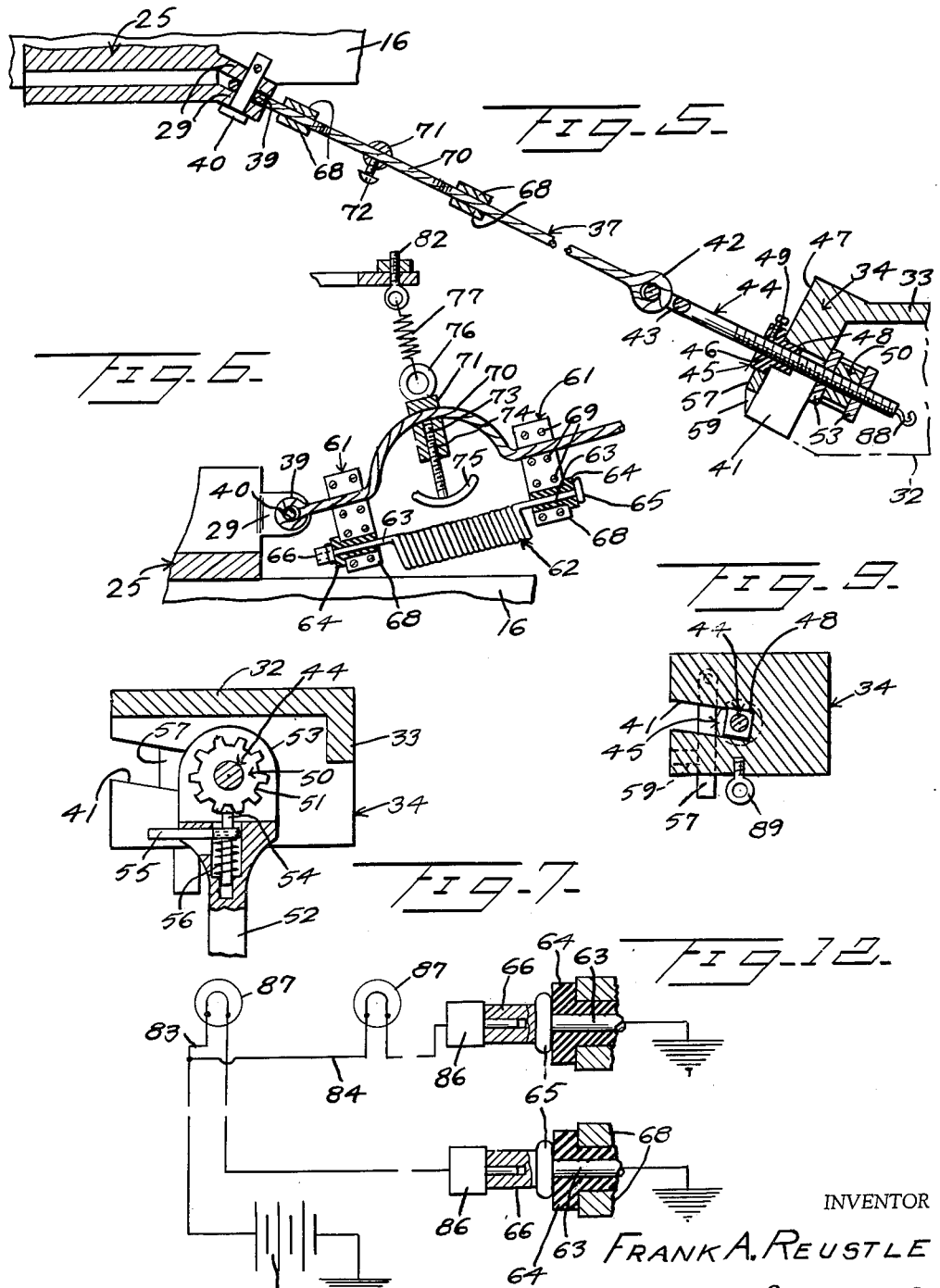

United States Patent Office 3,212,792
Patented Oct. 19, 1965

3,212,792
TRACTOR-TRAILER SAFETY HITCH
Frank A. Reustle, P.O. Box 14, Norma, N.J.
Filed Oct. 30, 1963, Ser. No. 320,105
5 Claims. (Cl. 280—432)

This invention relates to a novel safety hitch to prevent jackknifing of a trailer relative to its tractor or prime mover and including means for automatically signaling the tractor operator when the tractor and trailer have assumed an angular position relative to one another which would normally tend to cause jackknifing.

Another object of the invention is to provide a tractor-trailer safety hitch including means for exerting a yielding pull from the tractor toward a side of the trailer which is swung away from the tractor to tend to return the trailer to a position substantially in alignment with the tractor.

A further object of the invention is to provide a tractor-trailer safety hitch which may be readily detached from the trailer to enable the tractor to assume positions at a right angle to the trailer for maneuvering the trailer up to or away from a loading platform and through conjested areas adjacent loading platforms.

Still a further object of the invention is to provide a safety hitch which will minimize side away of the trailer relative to the tractor to reduce the amount of pulling power required to propel the trailer.

Various other objects and advantages of the invention will hereinafter become more fully apparent from the following description of the drawings, illustrating a presently preferred embodiment thereof, and wherein:

FIGURE 1 is a fragmentary view, partly in top plan, partly in section and partly broken away, showing the safety hitch;

FIGURE 2 is an enlarged fragmentary side elevational view showing one-half of the safety hitch;

FIGURE 3 is a fragmentary top plan view, partly broken away, showing the part of the hitch as seen in FIGURE 2, and taken substantially along the line 3—3 of FIGURE 2;

FIGURE 4 is an enlarged fragmentary cross sectional view taken substantially along the line 4—4 of FIGURE 2;

FIGURE 5 is an enlarged fragmentary sectional view taken substantially along the line 5—5 of FIGURE 2;

FIGURE 6 is an enlarged fragmentary vertical sectional view, taken substantially along the line 6—6 of FIGURE 3;

FIGURE 7 is an enlarged fragmentary transverse sectional view taken substantially along the line 7—7 of FIGURE 2;

FIGURE 8 is an enlarged longitudinal sectional view taken substantially along the line 8—8 of FIGURE 2;

FIGURE 9 is an enlarged fragmentary transverse sectional view taken substantially along a plane as indicated by the line 9—9 of FIGURE 2;

FIGURE 10 is a side elevational view, partly in section, of a part of the safety hitch;

FIGURE 11 is an enlarged vertical sectional view taken substantially along a plane as indicated by the line 11—11 of FIGURE 1, and FIGURE 12 is an enlarged fragmentary view partly in elevation, partly in section and partly diagrammatic, illustrating the electric signal circuits of the safety hitch.

Referring more specifically to the drawings, the rear portion of a conventional prime mover or tractor is shown in FIGURES 1 to 3 and is designated generally 15, and includes two longitudinally extending transversely spaced frame members 16 and 17, portions of which extend rearwardly from a rear part 18 of the tractor cab. A portion of the forward part of a trailer body is shown at 19 inculding the floor or deck 20 which is supported on and secured to transversely extending I-beams 21 which constitute a part of the trailer frame. The forward part of the trailer 19 is disposed over the rear part of the tractor 15 and is supported thereon and connected thereto by a conventional tractor-trailer hitch 22 which is disposed above and between the rear wheels 23 of the tractor.

The safety hitch, designated generally 24 and comprising the invention, includes complementary anchor members 25 and 26, as seen in FIGURES 1 and 4, which are secured to the frame members 16 and 17, respectively, immediately behind the cab 18, by suitable nut and bolt fastenings 27. Each of said anchors includes a top portion 28 which rests upon its frame member 16 or 17 and which has a pair of rearwardly projecting transversely spaced ears 29. The ears 29 of the two anchors 25 and 26 extend rearwardly in diverging relation to one another, as seen in FIGURE 1.

A left-hand anchor member 30 and a right-hand anchor member 31 are secured beneath the trailer floor 20 adjacent the left-hand and right-hand sides thereof, respectively. The anchors 30 and 31 each includes a top plate 32 and a depending inner flange 33. Each anchor member 30 and 31 has a thick front wall 34 which slopes downwardly slightly relative to its top plate 32 and which is canted slightly so that the planes of the walls 34 diverge outwardly relative to one another. The top plates 32 of the two anchor members 30 and 31 are disposed against the undersides of the forward I-beams 21, as seen in FIGURE 2, and nut and bolt fastenings 35 extend downwardly through plates 36 which rest on the upper side of the floor 20 and through the top plates 32, for securing the anchor members to the underside of the trailer frame, longitudinally thereof and adjacent opposite sides of the trailer. As seen in FIGURES 2 and 3, the fastenings 35 straddle the I-beams 21.

A nonelastic flexible element or cable 37 connects the tractor anchor 25 to the trailer anchor 30, and a corresponding element or cable 38 connects the other right-hand tractor anchor 26 to the right-hand trailer anchor 31. Each element or cable 37 and 38 has an eye 39 at its forward end, as seen in FIGURES 5 and 6, which fits between the ears 29 of the tractor anchor to which it is connected. A pin 40 extends through said pair of ears and through the eye 39 and is detachably secured in the ears for detachably anchoring the cable eye to the tractor anchor.

The front walls 34 of the two trailer anchors 30 and 31 are of substantial thickness and are each provided with a slot 41 which opens outwardly of the outer edge of said wall and which is inclined inwardly and downwardly, as best seen in FIGURES 7, 9 and 11. Each cable 37 and 38 has an eye 42 at its rear end which is connected to an eye 43 forming the forward end of a threaded rod 44. A collar 45 is threaded on each rod 44 and includes an enlarged head 46, constituting its forward end, which is adapted to abut against the front face 47 of one of the walls 34, and a restricted noncircular rear portion 48 which engages slidably and nonrotatively in the slot 41 of said wall, as seen in FIGURE 9. A setscrew 49 is threaded radially into the head 46 against the rod 44 to secure the collar 45 in a selected adjusted position, for a purpose which will hereinafter be described.

The two threaded rods 44 extend rearwardly through the slots 41 and each has a nut 50 threaded thereon and disposed behind the wall 34, through which said rod extends. Each nut 50 has a toothed periphery 51 forming a ratchet wheel, as seen in FIGURE 7. A lever 52 is associated with each rod 44 and includes a bifurcated head 53 the furcations of which straddle the nut 50 and are rotataively mounted on the rod 44. A pawl 54 is carried by each lever 52 and is disposed for sliding movement longitudinally thereof. Each pawl 54 has a laterally projecting handle 55 which is fixed thereto. A spring 56 is carried by each lever 52 and bears against the handle 55 for urging the pawl 54 into engagement with the ratchet wheel 51.

As best seen in FIGURE 11, a latch bar 57 of spring metal is swingably mounted at its upper end on a pivot pin 58 and is disposed for swinging movement across the front face 47. Pivot 58 is disposed above the slot 41. A cam element 59 is fixed to each front face 47 beneath the open end of the slot 41 thereof. The latch bar 57 is swung counterclockwise toward its operative position of FIGURE 11 and in so moving rides over the inclined surface of the cam 59 and is sprung outwardly thereby until said latch bar clears the inner end of the cam 59 whereupon it springs inwardly against the front face 47 and is held by engagement against the inner end or shoulder 60 of the cam. The latch bar 57 bears against a part of the head 46 to releasably retain the collar 45 and the rod 44 engaged thereby in the closed inner end of the slot 41.

Two clamps 61 are adjustably secured immovably to longitudinally spaced portions of each cable 37 and 38, adjacent the eye 39 thereof, and a contractile coil spring 62 extends between each pair of clamps and has aligned ends 63 which are secured in said clamps 61. The ends 63 are disposed in grommets or sleeves 64 of electrical insulating material for electrically insulating the spring 62 from said clamps and from the cable 37 or 38. The spring ends 63 have heads 65 disposed beyond the clamps 61 and a socket 66 projects from one of said heads 65, as best seen in FIGURE 12. The clamps 61 are each composed of two plates 68, as best seen in FIGURE 8, which are connected by fastenings 69. The clamps 61 are spaced apart a distance on the cables 37 and 38 so that when the coils of the springs 62 are in abutting engagement with one another, as seen in FIGURES 6 and 8, slack will be provided in each cable between the clamps thereof and which will form a loop 70. Each loop 70 extends transversely through a member 71 of electrical conducting material and which is secured to said loop by a setscrew 72, as seen in FIGURE 5. The member 71 has a threaded bore 73 opening outwardly of its inner end to adjustably receive a threaded rod 74 having a head 75 on the exposed end thereof, which rod and head are also formed of electrical conducting material. The other outer end of the member 71 terminates in an eye 76 to which is connected one end of a week contractile spring 77.

A bar 78, preferably of angular shape in cross section, extends between the anchor members 25 and 26 and is connected at its ends thereto by fastenings 79. Brackets 80 are secured by fastenings 81 to the bar 78 and support eye fastenings 82 to which the other ends of the springs 77 are connected, and which eye fastenings 82 are disposed above the loops 70 for holding said loops away the springs 62, to thus hold the heads 75, which form movable electrical contacts, spaced from the springs 62.

As seen in FIGURE 12, electrical conductors 83 and 84 lead from the positive terminal of a conventional storage battery 85 of the tractor 15 and terminate in plugs 86 which engage the sockets 66. A light bulb 87 is interposed in each conductor 83 and 84, and said light bulbs may be mounted on the instrument panel, not shown, of the tractor 15.

The collars 45 are adjusted on the rods 44 so that when the heads 46 thereof are drawn into abutting engagement with the front walls 47 by manipulation of the pawl and ratchet means 51, 54, the cables 37 and 38 will be tensioned only sufficiently so that the springs 62 will not be stretched and will be disposed with their convolutions abutting. The tractor-trailer in making a normal left turn, for example, will cause a pull to be exerted on the cable 38. If the turn is such that the axis of the tractor forms an angle of approximately 20° to the axis of the trailer, the spring 62 of the cable 38 will absorb the pull exerted on said cable due to the anchor member 26 moving away from the anchor member 31, and only a part of the slack 70 will be taken up in said cable and which will be insufficient to move the contact 75 into engagement with the spring 62. If the turn is somewhat sharper, as for example, so that the tractor axis assumes an angle of 25° to the trailer axis, a greater amount of the slack 70 will be taken up and the contact 75 will engage the spring 62 to ground the conductor 84 through the cable 38 to the tractor frame member 17 for energizing the light bulb 87 of said conductor 84 to indicate to the tractor operator the extent for the turn being made. If still a sharper turn is made so that the tractor assumes a position with its axis approximately 30° to the axis of the trailer, the light bulb of the conductor 84 will be energized before the tractor has assumed its maximum angle to the trailer and substantially all of the slack or loop 70 will be taken up, and the momentum of the trailer will commence to push the tractor. If the tractor axis assumes an angle greater to the trailer axis greater than 30°, all of the slack will have been removed from the cable 38 and said cable 38 and the hitch 22 will be required to function to prevent jackknifing of the tractor-trailer. While the tensioned cable 38 will ordinarily enable the tractor operator to regain control of his vehicle, so that jackknifing will not occur, the safety hitch in addition to preventing jackknifing, warns the tractor operator by a visual signal when his tractor and trailer have assumed a dangerous angle relative to one another.

In making a right turn the same conditions would exist in connection with the left-hand cable 37.

In order for the vehicle to be manipulated in loading and unloading areas said for movement up to and away from loading platforms, the safety hitch must be disconnected in order that the tractor can assume angle as great as 90° to the trailer. This is quickly accomplished by manipulating the levers 52 for loosening the nuts 50. The latch bars 57 can then be manually released and the rods 44 disengaged from the anchor members 30 and 31 through the open ends of the slots 41. The rear ends of the rods 44 carry hooks 88 which can be engaged with eyes 89 which depend from the walls 34 for loosely suspending the cables 37 and 38 while thus disconnected. After unloading or loading has been accomplished and before highway travel is resumed, the rods 44 are re-applied to the anchor members 30 and 31 and tightened as heretofore described by manipulation of the levers 52. In re-applying the rods the same amount of tension will be applied to the cables, since the nuts 50 can only be adjusted until the collar heads 46 abut the front faces 47.

The planes of the walls 34 are inclined and canted so as to be normal to the axes of the cables 37 and 38 and the pairs of ears 29 are disposed so as to be parallel to the cables to which said ears are connected, as seen in FIGURE 5.

Various modifications and changes are contemplated and may be resorted to, without departing from the function or scope of the invention, as hereinafter defined by the appended claims.

I claim as my invention:

1. A tractor-trailer safety hitch comprising anchor members secured to transversely spaced portions of a trailer, anchor members secured to transversely spaced portions of a tractor, a pair of non-elastic cables having forward ends connected to the tractor anchors, means connecting rear ends of said cables to the trailer anchors with said cables disposed in transversely spaced relation to one another, tensioning means yieldably holding slack in an intermediate portion of each of said cables and permitting a limited extension thereof and a predetermined increase in the spacing between the anchors to which said cable is connected, and an electric signal associated with each cable including a contact element carried by the slack portion of said cable and movable to a circuit closing position by diminishment of said slack portion for closing the circuit of the signal.

2. A tractor-trailer safety hitch comprising anchor members secured to transversely spaced portions of a trailer, anchor members secured to transversely spaced portions of a tractor, a pair of non-elastic cables having forward ends connected to the tractor anchors, means connecting rear ends of said cables to the trailer anchors with said cables disposed in transversely spaced relation to one another, tensioning means yieldably holding slack in an intermediate portion of each of said cables and permitting a limited extension thereof and a predetermined increase in the spacing between the anchors to which said cable is connected, said means for holding slack in each cable comprising a pair of clamps secured to longitudinally spaced portions of the cable and a contractile coil spring extending between and anchored to said clamps and having a normal length less than the length of the cable portion disposed between the clamps.

3. A tractor-trailer safety hitch comprising anchor members secured to transversely spaced portions of a trailer, anchor members secured to transversely spaced portions of a tractor, a pair of non-elastic cables having forward ends connected to the tractor anchors, means connecting rear ends of said cables to the trailer anchors with said cables disposed in transversely spaced relation to one another, tensioning means yieldably holding slack in an intermediate portion of each of said cables and permitting a limited extension thereof and a predetermined increase in the spacing between the anchors to which said cable is connected, each of said first mentioned trailer anchors including a wall disposed in a plane substantially normal to the axis of the cable thereof and having a slot extending therethrough an opening outwardly of an outer edge of said wall, said means for connecting the cables to the trailer anchors including a rod individual to each cable and secured to the rear end thereof and extending through and detachably mounted in the slot of the trailer anchor, and pawl and ratchet means carried by each rod and bearing against the anchor thereof for exerting a pull on the rod to tension the cable connected thereto.

4. A tractor-trailer safety hitch as in claim 3, a collar adjustably secured to each rod having a part nonrotatively engaging the slot of the anchor thereof and another part abutting against said wall for limiting the extent that the cable can be tensioned by said pawl and ratchet means.

5. A tractor-trailer safety hitch as in claim 4, and a spring latch carried by each of the trailer anchors and disposed to extend across the slot thereof, in one position of the latches, for releasably latching said rods in said wall.

References Cited by the Examiner
UNITED STATES PATENTS

| | | | |
|---|---|---|---|
| 2,628,107 | 2/53 | Schlairet. | |
| 2,691,533 | 10/54 | Koontz | 280—405 |
| 2,721,087 | 10/55 | Pearson | 280—457 |
| 2,838,325 | 6/58 | Begin | 280—432 |
| 3,116,074 | 12/63 | Koontz | 280—405 |

A. HARRY LEVY, *Primary Examiner.*

LEO FRIAGLIA, BENJAMIN HERSH, *Examiners.*